(12) United States Patent
Kratzer

(10) Patent No.: US 9,222,595 B2
(45) Date of Patent: Dec. 29, 2015

(54) HYDRAULICALLY CONTROLLED STORAGE CHAMBER VALVE

(71) Applicant: Robert Bosch GmbH, Stuttgart (DE)

(72) Inventor: Dietmar Kratzer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/369,457

(22) PCT Filed: Dec. 19, 2012

(86) PCT No.: PCT/EP2012/076062
§ 371 (c)(1),
(2) Date: Jun. 27, 2014

(87) PCT Pub. No.: WO2013/098144
PCT Pub. Date: Jul. 4, 2013

(65) Prior Publication Data
US 2014/0361204 A1    Dec. 11, 2014

(30) Foreign Application Priority Data

Dec. 27, 2011    (DE) .......................... 10 2011 089 956

(51) Int. Cl.
*F16L 55/04*    (2006.01)
*F16K 31/122*    (2006.01)
*B60T 8/34*    (2006.01)
(Continued)

(52) U.S. Cl.
CPC ............. *F16K 31/1221* (2013.01); *B60T 8/341* (2013.01); *B60T 8/368* (2013.01); *B60T 8/4872* (2013.01)

(58) Field of Classification Search
CPC ......... B60T 7/042; B60T 8/341; B60T 8/368; B60T 8/4872

USPC ............... 138/31, 30; 137/505.27, 505.29, 137/505.39; 303/115.4, 115.1, 119.2; 251/339
See application file for complete search history.

(56) References Cited

U.S. PATENT DOCUMENTS

| 5,388,899 A | * | 2/1995 | Volz et al. | .................. | 303/119.2 |
| 6,302,498 B1 | * | 10/2001 | Ariki et al. | ................. | 303/115.4 |
| 7,543,896 B2 | * | 6/2009 | Ariki et al. | ................. | 303/115.4 |

(Continued)

FOREIGN PATENT DOCUMENTS

| DE | 42 02 388 A1 | 8/1993 |
| DE | 10 2009 028 912 A1 | 3/2010 |

(Continued)

OTHER PUBLICATIONS

International Search Report corresponding to PCT Application No. PCT/EP2012/076062, mailed Mar. 15, 2013 (German and English language document) (5 pages).

*Primary Examiner* — Patrick F Brinson
(74) *Attorney, Agent, or Firm* — Maginot, Moore & Beck LLP

(57) ABSTRACT

A hydraulically controlled storage chamber valve includes a closing element that is biased via a first compression spring. The closing element seals a valve seat in a valve body. A tappet protrudes through a bushing in the valve body and is movable by an accumulator piston that is loaded by a second compression spring that is configured to push the closing element out of the valve seat when a specified force ratio is present between spring bias forces and a hydraulically acting force. The tappet is fastened in a region of the bushing such that the tappet is movable in a longitudinal direction and lies flush with a face of the accumulator piston while moving.

15 Claims, 1 Drawing Sheet

(51) Int. Cl.
*B60T 8/36* (2006.01)
*B60T 8/48* (2006.01)

(56) References Cited

U.S. PATENT DOCUMENTS

| | | | |
|---|---|---|---|
| 8,215,724 B2* | 7/2012 | Aoba et al. | 303/115.4 |
| 8,656,960 B2* | 2/2014 | Haecker et al. | 138/31 |
| 8,783,793 B2* | 7/2014 | Terashima et al. | 303/115.1 |
| 8,801,113 B2* | 8/2014 | Terashima et al. | 303/119.3 |
| 8,936,323 B2* | 1/2015 | Terashima | 303/115.1 |
| 2006/0091725 A1 | 5/2006 | Ariki et al. | |
| 2010/0052417 A1* | 3/2010 | Aoba et al. | 303/115.4 |

FOREIGN PATENT DOCUMENTS

| | | |
|---|---|---|
| DE | 10 2011 087 816 A1 | 6/2012 |
| WO | 93/19960 A1 | 10/1993 |

\* cited by examiner

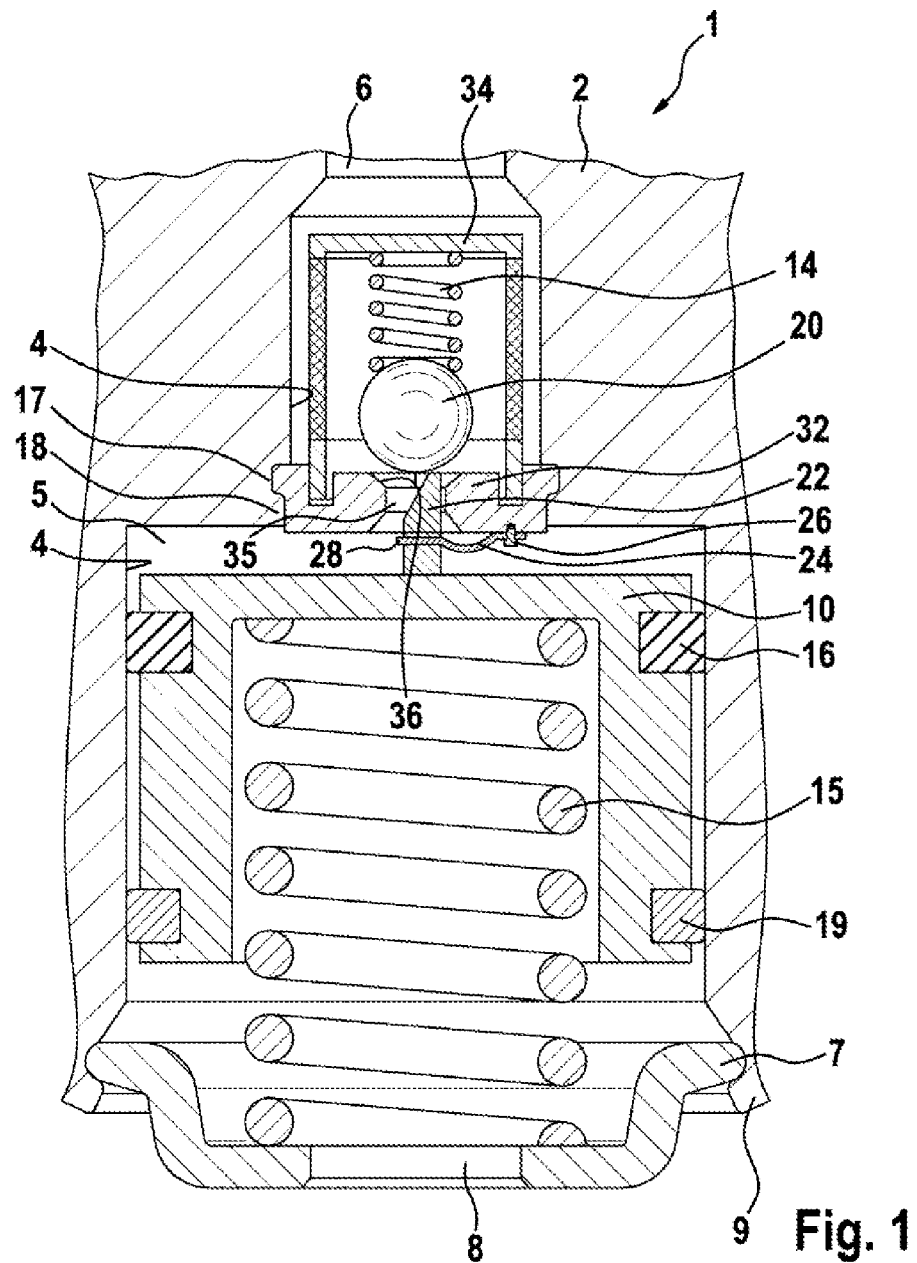
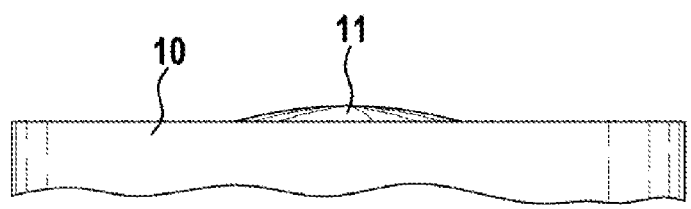

HYDRAULICALLY CONTROLLED STORAGE CHAMBER VALVE

This application is a 35 U.S.C. §371 National Stage Application of PCT/EP2012/076062, filed on Dec. 19, 2012, which claims the benefit of priority to Serial No. DE 10 2011 089 956.1, filed on Dec. 27, 2011 in Germany, the disclosures of which are incorporated herein by reference in their entirety.

The disclosure proceeds from a hydraulically controlled storage chamber valve.

BACKGROUND

Patent specification U.S. Pat. No. 7,543,896 B2 discloses, for example, a hydraulically controlled storage chamber valve in which a spring-prestressed ball-type seat valve is opened via a tappet in the storage piston. This takes place at a system-specified force ratio between the spring prestressing force and hydraulically active force. The actuation of the ball-type seat valve takes place via a cylindrical metallic tappet which is pressed into the storage piston. The storage piston also receives a sealing ring and a guide ring. An appropriately prestressed compression spring is located between the storage piston and the closing cover which is connected to the pump housing by holding calking. The spring force acts counter to the hydraulically active force at the storage piston and, when there is an excess of spring force, causes displacement of the storage piston/tappet combination in the opening direction of the storage chamber valve. In this case, the ball is moved out of the seat by the tappet and the storage chamber valve is opened.

Laid-open publication DE 42 02 388 A1 describes, for example, a hydraulic brake system for a motor vehicle. The brake system described comprises a hydraulically controlled storage chamber valve, with a closing element which is prestressed via a first compression spring and seals off a valve seat in a valve body, and with a tappet which is connected to a storage piston loaded by a second compression spring and presses the closing element out of the valve seat when a specified force ratio prevails between the spring prestressing forces and a hydraulically active force. In these designs of storage chamber valves, the sealing body of the valve closed with spring assistance is moved by a pin connected to the storage piston into the open position as soon as the storage chamber volume undershoots a threshold value, that is to say the storage piston approaches the stop.

SUMMARY

By contrast, the hydraulically controlled storage chamber valve according to the disclosure has the advantage that the individual parts can be produced more simply and the production costs can be lowered. Embodiments of the present disclosure make it possible to reduce the accuracy requirements in the manufacture, assembly and design of the storage chamber valve, so that outlay and production costs can be further reduced and functional robustness can be increased.

The essence of the disclosure is that the tappet is not fastened to the storage piston, but instead to the valve body or other components of the valve subassembly, and that the tappet is actuated as a result of pressure contact by the upcoming storage piston.

Embodiments of the present disclosure make available a hydraulically controlled storage chamber valve which comprises a closing element, which is prestressed via a first compression spring and seals off a valve seat in a valve body, and a tappet, which passes through a leadthrough in the valve body and can be moved by a storage piston loaded by a second compression spring, in order to press the closing element out of the valve seat when a specified force ratio prevails between the spring prestressing forces and a hydraulically active force. This means that the spring force, acting upon the storage piston, of the second compression spring is higher than the hydraulic force acting upon the storage piston and the prestressing force, acting upon the closing element, of the first compression spring. According to the disclosure, the tappet is fastened longitudinally movably in the region of the leadthrough and, during the movement, bears against an end face of the storage piston.

A further advantage of the disclosure is that a standard storage piston can be used, and therefore there is no need for the outlay and costs of a special piston with an attached one-part and/or multipart tappet and/or with further special measures, such as, for example, guide rings, guidance length, seals, etc., for an especially accurate linear movement of the storage piston in order to introduce the attached tappet into the valve body bore reliably and robustly over tolerance-range and operating positions. Moreover, embodiments of the present disclosure also allow an eccentric arrangement of the storage chamber valve, since functioning is ensured independently of where the storage piston impinges with its end face on the tappet.

Advantageous improvements of the hydraulically controlled storage chamber valve are possible as a result of the measures and developments described in the present disclosure.

It is especially advantageous that the valve body, with the valve seat and with the tappet, can be arranged centrally in a reception bore forming a storage chamber.

In an advantageous refinement of the hydraulically controlled storage chamber valve according to the disclosure, the storage piston may have on its end face actuation means for actuating the tappet. This means that the end face of the storage piston may not be made planar, but instead may be in the form of a spherical segment or appropriately curved in another way, if appropriate even irregularly, nonuniformly, in a stepped manner, etc. In the case of a central arrangement of the valve body with the valve seat and with the tappet, the control piston may have, for example, a central curvature as an actuation means for actuating the tappet. The selected midpoint of the curved spherical segment may expediently be a point about which the storage piston mainly rotates when it deviates from its theoretically linear movement. What is achieved by the spherical segment is that the tappet can always be opened independently of the type of nonlinear movement of the piston.

In a further advantageous refinement of the hydraulically controlled storage chamber valve according to the disclosure, an elastic holding element with reception means may be fastened to the valve body in order to guide the tappet in the leadthrough. The elastic holding element may, for example, be fastened to the valve body by screwing, calking or clipping. The tappet can be held in its position in the valve body leadthrough by the resilient holding element such that, upon contact with the storage piston, the desired opening action is exerted on the closing element. The active opening force comes for the most part from the storage piston or the second compression spring, not from the holding element. The holding element may, for example, be manufactured from metal, plastic, elastomer, etc. or from corresponding material combinations.

An exemplary embodiment of the disclosure is illustrated in the drawings and is explained in more detail in the follow-

BRIEF DESCRIPTION OF THE DRAWINGS

FIG. 1 shows a diagrammatic illustration in longitudinal section of a valve arrangement with an exemplary embodiment of a storage chamber valve according to the disclosure.

FIG. 2 shows in the form of a detail a diagrammatic illustration of the end face of a control piston for the storage chamber valve according to the disclosure from FIG. 1.

DETAILED DESCRIPTION

A separate tappet which is connected firmly to the storage piston and presses against the valve closing element is known from the prior art. Since, as a consequence of the adopted principle, a certain amount of play is necessary between the storage piston and the housing, the impingement of the tappet upon the closing element has to be ensured by means of stringent requirements in terms of the component tolerances. Since the lever arm of the tappet is relatively long in relation to the center of rotation of the control piston and rotation of the control piston about its vertical axis (lifting direction) is possible, the tappet and the storage chamber valve are arranged centrally in the control piston or in the storage chamber bore. Since the tappet is firmly connected to the storage piston and has to penetrate through the valve body orifice in order to move the sealing body into the open position, high precision in the geometry of the parts and in the lifting movement is required for the storage piston and tappet. This precision of the parts is usually achieved by means of highly accurate, that is to say cost-intensive, parts, manufacture and assembly. The precision of the storage piston lifting movement is achieved by means of a more complicated design, such as, for example, with additional guide rings, a long guidance length, etc.

FIG. 1 shows a valve arrangement with a hydraulically controlled storage chamber valve 1 according to the disclosure which is arranged in a stepped reception bore 4 of a fluid block 2 or pump housing. Embodiments of the hydraulically controlled storage chamber valve 1 according to the disclosure can be used, for example, in a hydraulic brake system in a vehicle.

As is evident from FIGS. 1 and 2, the illustrated exemplary embodiment of the hydraulically controlled storage chamber valve 1 comprises a closing element 20, prestressed via a first compression spring 14, and a tappet 22. In this case, the closing element 20 seals off a valve seat 36 in a valve body 32. The tappet 22 passes through a leadthrough 35, which is located in the valve body 32 and at the margin of which the valve seat 36 is formed, and is moved by a storage piston 10 loaded by a second compression spring 15, in order to press the closing element 20 out of the valve seat 36 when a specified force ratio prevails between the spring prestressing forces and a hydraulically active force. In the exemplary embodiments illustrated, this is the case when the spring force, acting upon the storage piston 10, of the second compression spring 15 is higher than the hydraulic force acting upon the storage piston 10 and the prestressing force, acting upon the closing element 20, of the first compression spring 14. When the spring force, acting upon the storage piston 10, of the second compression spring 15 is lower than the hydraulic force acting upon the storage piston 10 and the prestressing force, acting upon the closing element 20, of the first compression spring 14, then the closing element 20 is pressed into the valve seat 36. The first compression spring 14 and the closing element 20 are guided in a filter 34 which additionally filters suspended matter out of the conveyed medium.

According to the disclosure, the tappet 22 is fastened longitudinally movably in the region of the leadthrough 35 and, during the movement, bears against an end face of the storage piston 10. This advantageously makes it possible to reduce the accuracy requirements with regard to the manufacture, assembly and design of the hydraulically controlled storage chamber valve 1, so that outlay and production costs can be reduced and functional robustness can be increased.

As is also evident from FIGS. 1 and 2, in the illustrated exemplary embodiment of the hydraulically controlled storage chamber valve 1 according to the disclosure the valve body 32 with the valve seat 36 and the tappet 22 is arranged centrally in a reception bore 4 forming a storage chamber 5. However, the essence of the exemplary embodiment is that the tappet 22 is not fastened movably to the storage piston 10, but instead to the valve body 32, and that the tappet 22 is actuated as a result of pressure contact by the upcoming storage piston 10.

In the exemplary embodiment illustrated, the tappet 22 is held in its position in the leadthrough 35 of the valve body 32 by an elastic holding element 24 with reception means 28, which is designed, for example, as a resilient holding plate with a reception bore, such that, upon contact with the storage piston 10, the desired opening action is exerted on the closing element 20 designed as a ball 20. The active opening force comes for the most part from the storage piston 10 or the second compression spring 15, not from the holding element 24. The tappet 22, by means of its defined shape, may be held and guided in the leadthrough 35, for example, in a definedly eccentric way.

The holding element 24 may, for example, be manufactured from metal, plastic, elastomer, etc. or any material combinations of these. In the exemplary embodiment illustrated, the holding element 24 for the tappet 22 is screwed to the valve body 32 via a fastening element 26 designed as a screw. Alternatively, other types of fastening, such as, for example, calking, clipping, one-part shaping, etc., are also possible. The designation "holding plate" is not intended to constitute any restriction to the form of the construction, but instead is a first favorable embodiment which, as well as maintaining position, also expresses the resilient, flexible action of the holding element 24. Moreover, other, for example meander-shaped, radially cylindrical forms of construction may also be envisaged for the holding element 24.

One advantage of the first exemplary embodiment is that a standard storage piston 10 can be used. Outlay and costs for a special piston can thus be avoided.

As is also clear from FIG. 2, in the exemplary embodiment illustrated the storage piston 10 does not have a planar end face, but instead a curvature 11 in the form of a spherical segment. Alternatively, other expediently curved, if appropriate even irregular, nonuniform, stepped elevations of the end face of the storage piston are also possible. The midpoint of the spherical segment is advantageously a point about which the storage piston 10 mainly rotates when it deviates from its theoretically linear movement. What is achieved by the spherical segment is that the tappet 22 is always opened independently of the type of nonlinear movement of the storage piston 10.

As is also evident from FIG. 1, in the illustrated exemplary embodiment of the hydraulically controlled storage chamber valve 1 according to the disclosure the valve body 32 is mounted in the fluid block 2 or in the pump housing via a calking region 17 and is fixed in its position by a first holding calking 18. In the exemplary embodiment illustrated, a stepped calking region 17 is formed on the valve body 32. To produce the first holding calking 18 with the corresponding calking region 17, material of the fluid subassembly 2 or of the pump housing is deformed plastically by means of a suitable calking tool, so as to form a preferably peripheral ledge which at least partially covers the calking region 17.

The actuation of the storage chamber valve 1 takes place by means of the axial displacement of the storage piston 10 and the actuation of the closing element 20 via the tappet 22. The storage piston 10 is guided in the stepped reception bore 4 in the fluid block 2 or pump housing via a sealing ring 16 and a guide ring 19. The second prestressed compression spring 15 is arranged between the storage piston 10 and a closing cover 7 which is connected to the fluid block 2 or pump housing by a further holding calking 9. To produce the further holding calking 9 with the closing cover 7, material of the fluid subassembly 2 or of the pump housing is deformed plastically by means of a suitable calking tool, so as to form a preferably peripheral ledge which at least partially covers the margin of the closing cover 7. Moreover, the underside of the storage piston 10 is connected to atmospheric pressure via an orifice 8 in the closing cover 7. A storage chamber 5 of the storage chamber valve 1 is formed between the top side of the storage piston 10 and the valve body 32. The storage chamber valve 1 is open in the pressureless state. This takes place via displacement of the storage piston 10 into an upper end position, brought about by the prestressed second compression spring 15 which acts upon the underside of the storage piston 10.

During the operation of the hydraulic system, preferably of the hydraulic brake system for a motor vehicle, the spring force of the second compression spring 15 acts counter to the spring force of the first compression spring 14 and to the hydraulically active force on the storage piston 10. In this case, an excess of hydraulic force causes displacement of the closing element 20 in the closing direction of the storage chamber valve 1 via the tappet 22. The closing element 20 is in this case pressed into the valve seat 36 by the spring force of the first compression spring 14. An excess of spring force of the second compression spring 15 causes displacement of the tappet/closing element combination in the opening direction of the storage chamber valve 1. In this case, the closing element 20 is moved out of the valve seat 36 by the tappet 22 and the storage chamber valve 1 is opened. In the open state, the fluid can flow, virtually unimpeded, from a first fluid connection 6, which is connected, for example, to a brake master cylinder, via the filter 34 and the open valve seat 36 to a fluid connection, not illustrated, which issues into the storage chamber 5 and is connected, for example, to a recirculating pump.

Embodiments of the present disclosure make available a storage chamber valve, the individual parts of which can advantageously be produced in a simplified way so that the production costs can be lowered. Furthermore, embodiments of the present disclosure make it possible to reduce the accuracy requirements in respect of the manufacture, assembly and design of the storage chamber valve, so that outlay and production costs can be further reduced and functional robustness can be increased.

The invention claimed is:

1. A hydraulically controlled storage chamber valve, comprising:
    a closing element prestressed towards a valve seat defined on a valve body by a first compression spring; and
    a tappet positioned at least partially in a leadthrough defined in the valve body and movably fastened to the valve body, the tappet longitudinally movable by contact with an end face of a storage piston loaded by a second compression spring and configured to press the closing element away from the valve seat when a specified force ratio prevails between spring prestressing forces of the first compression spring and the second compression spring and a hydraulically active force.

2. The hydraulically controlled storage chamber valve as claimed in claim 1, wherein the valve body is positioned centrally in a reception bore and forms a storage chamber.

3. The hydraulically controlled storage chamber valve as claimed in claim 1, wherein the storage piston has, on an end face, an actuation member configured to actuate the tappet.

4. The hydraulically controlled storage chamber valve as claimed in claim 3, wherein the storage piston has a central curvature configured to actuate the tappet.

5. The hydraulically controlled storage chamber valve as claimed in claim 1, wherein an elastic holding element with a reception member is fastened to the valve body and is configured to guide the tappet in the leadthrough.

6. The hydraulically controlled storage chamber valve as claimed in claim 5, wherein the elastic holding element is fastened to the valve body by one of screwing, calking and clipping.

7. A hydraulically controlled storage chamber valve, comprising:
    a closing element which is prestressed via a first compression spring and seals off a valve seat in a valve body;
    a tappet which passes through a leadthrough in the valve body and which is movable by a storage piston loaded by a second compression spring that is configured to press the closing element out of the valve seat when a specified force ratio prevails between spring prestressing forces and a hydraulically active force, wherein the tappet is fastened longitudinally movably in a region of the leadthrough and bears against an end face of the storage piston when moving; and
    an elastic holding element with a reception member fastened to the valve body and configured to guide the tappet in the leadthrough.

8. The hydraulically controlled storage chamber valve as claimed in claim 7, wherein the elastic holding element is fastened to the valve body by one of screwing, calking and clipping.

9. The hydraulically controlled storage chamber valve as claimed in claim 7, wherein the valve body is positioned centrally in a reception bore and forms a storage chamber.

10. The hydraulically controlled storage chamber valve as claimed in claim 7, wherein the storage piston has, on an end face, an actuation member configured to actuate the tappet.

11. The hydraulically controlled storage chamber valve as claimed in claim 10, wherein the storage piston has a central curvature configured to actuate the tappet.

12. A hydraulically controlled storage chamber valve, comprising:
    a closing element prestressed towards a valve seat defined on a valve body by a first compression spring; and
    a tappet positioned at least partially in a leadthrough defined in the valve body, the tappet longitudinally movable by engagement with a curved end face of a storage piston separate from the tappet and loaded by a second compression spring, the tappet configured to press the closing element away from the valve seat when a specified force ratio prevails between spring prestressing forces of the first compression spring and the second compression spring and a hydraulically active force.

13. The hydraulically controlled storage chamber valve as claimed in claim 12, wherein the valve body is positioned centrally in a reception bore and forms a storage chamber.

14. The hydraulically controlled storage chamber valve as claimed in claim 13, wherein an elastic holding element with a reception member is fastened to the valve body and is configured to guide the tappet in the leadthrough.

15. The hydraulically controlled storage chamber valve as claimed in claim 14, wherein the elastic holding element is fastened to the valve body by one of screwing, calking and clipping.

* * * * *